US009652685B2

(12) United States Patent
Sigal et al.

(10) Patent No.: US 9,652,685 B2
(45) Date of Patent: May 16, 2017

(54) GENERATING STORY GRAPHS WITH LARGE COLLECTIONS OF ONLINE IMAGES

(71) Applicant: Disney Enterprises, Inc., Burbank, CA (US)

(72) Inventors: Leonid Sigal, Pittsburgh, PA (US); Gunhee Kim, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 242 days.

(21) Appl. No.: 14/502,473

(22) Filed: Sep. 30, 2014

(65) Prior Publication Data
US 2016/0093334 A1 Mar. 31, 2016

(51) Int. Cl.
*G06K 9/00* (2006.01)
*G06K 9/62* (2006.01)
*G06K 9/46* (2006.01)

(52) U.S. Cl.
CPC ....... *G06K 9/4604* (2013.01); *G06K 9/00677* (2013.01); *G06K 9/6226* (2013.01)

(58) Field of Classification Search
None
See application file for complete search history.

(56) References Cited

U.S. PATENT DOCUMENTS

| | | | | |
|---|---|---|---|---|
| 2010/0146433 | A1* | 6/2010 | Murata | G06F 3/016 715/782 |
| 2010/0250672 | A1* | 9/2010 | Vance | G06Q 10/109 709/204 |
| 2011/0243452 | A1* | 10/2011 | Sakaguchi | G06F 17/30274 382/190 |
| 2012/0239504 | A1* | 9/2012 | Curlander | G06Q 30/02 705/14.66 |
| 2014/0132400 | A1* | 5/2014 | Heaven | H04W 4/001 340/12.5 |
| 2014/0236542 | A1* | 8/2014 | Abhyanker | G06Q 10/087 703/1 |

(Continued)

OTHER PUBLICATIONS

C.-Y. Chen and K. Grauman. "Watching Unlabeled Video Helps Learn New Human Actions from Very Few Labeled Snapshots". In CVPR, 2013.

(Continued)

*Primary Examiner* — Randolph I Chi
(74) *Attorney, Agent, or Firm* — Patterson + Sheridan, LLP

(57) ABSTRACT

Embodiments presented herein describe techniques for generating a story graph using a collection of digital media, such as images and video. The story graph presents a structure for activities, events, and locales commonly occurring in sets of photographs taken by different individuals across a given location (e.g., a theme park, tourist attraction, convention, etc.). To build a story graph, streams from sets of digital media are generated. Each stream corresponds to media (e.g., images or video) taken in sequence at the location by an individual (or related group of individuals) over a period of time. For each stream, features from each media are extracted relative to the stream. Clusters of media are generated and are connected by directed edges. The connections indicate a path observed to have occurred in the streams from one cluster to another cluster.

6 Claims, 10 Drawing Sheets

(56) References Cited

U.S. PATENT DOCUMENTS

| | | | | |
|---|---|---|---|---|
| 2014/0258309 | A1* | 9/2014 | Young | G06F 17/3053 707/748 |
| 2014/0278642 | A1* | 9/2014 | Robinson | G06Q 10/06311 705/7.15 |
| 2014/0279199 | A1* | 9/2014 | Robinson | G06Q 30/0631 705/26.7 |
| 2014/0279244 | A1* | 9/2014 | Robinson | H04W 4/02 705/26.61 |
| 2014/0358735 | A1* | 12/2014 | Robinson | G06Q 30/0641 705/27.1 |
| 2015/0336013 | A1* | 11/2015 | Stenzler | A63G 31/00 700/90 |
| 2016/0134714 | A1* | 5/2016 | Ono | G06Q 50/01 709/205 |

OTHER PUBLICATIONS

L. Chen, L. Duan, and D. Xu. "Event Recognition in Videos by Learning from Heterogeneous Web Sources". In CVPR, 2013.

Deng, W. Dong, R. Socher, L-J. Li, K. Li, and L. Fei-Fei. "ImageNet: A Large-Scale Hierarchical Image Database". In CVPR, 2009.

A. Gupta, P. Srinivasan, J. Shi, and L. S. Davis. "Understanding Videos, Constructing Plots: Learning a Visually Grounded Storyline Model from Annotated Videos". In ICCV, 2009.

A. Khosla, R. Hamid, C.-J. Lin, and N. Sundaresan. "Large-Scale Video Summarization Using Web-Image Priors". In CVPR, 2013.

G. Kim and E. P. Xing. "Jointly Aligning and Segmenting Multiple Web Photo Streams for the Inference of Collective Photo Storylines". In CVPR, 2013.

Y. J. Lee, J. Ghosh, and K. Grauman. "Discovering Important People and Objects for Egocentric Video Summarization". In CVPR, 2012.

H. Misra, F. Hopfgartner, A. Goyal, P. Punitha, and J. M. Jose. "TV News Story Segmentation Based on Semantic Coherence and Content Similarity". In MMM, 2010.

A. Prest, C. Leistner, J. Civera, C. Schmid, and V. Ferrari. "Learning Object Class Detectors from Weakly Annotated Video". In CVPR, 2012.

R. Raguram and S. Lazebnik. "Computing Iconic Summaries of General Visual Concepts". In CVPRW Internet Vision, 2008.

I. Simon, N. Snavely, and S. M. Seitz. "Scene Summarization for Online Image Collections". In ICCV, 2007.

K. Tang, V. Ramanathan, L. Fei-Fei, and D. Koller. "ShiftingWeights: Adapting Object Detectors from Image to Video". In NIPS, 2012.

* cited by examiner

GENERATING STORY GRAPHS WITH LARGE COLLECTIONS OF ONLINE IMAGES

BACKGROUND

Field

Embodiments of the present disclosure generally relate to digital media (e.g., videos, images, etc.). More specifically, embodiments describe generating photo-based story graphs using a large collection of digital media.

Description of the Related Art

Digital images have become widely available as devices that include a camera (e.g., smart phones, wearable media, and digital cameras) have become commonplace. For instance, an individual can easily carry around a smart phone and take photographs in different places to capture memorable experiences.

Further, many online services allow individuals to share their digital photographs on websites and smart phone applications. Through these services, an individual uploads photos to a server (e.g., via an interface) and organize the photos in online albums or collections. Many services also allow the individual to tag photos with additional information, such as names of people in a photo, a location of where the individual took the photo, and so on. For example, a user can upload digital photos taken during a recent trip to a theme park into an online album. The user may tag each photo (or the entire album) with the name of the theme park or a location within the theme park. Once completed, the user may provide a link to the album to others to share memorable experiences captured in the photos.

As a result, the available digital images and corresponding metadata provide a wealth of information.

SUMMARY

One embodiment is directed to a method for generating a representation of activities occurring within a given location having one or more landmarks based on a collection of digital media. The method generally includes generating, via a processor, a plurality of streams from the collection of media. Each stream corresponds to an ordered sequence of media captured by an individual over a given period of time. Features are extracted from one or more of the media in each stream. One or more clusters of the collection of the media are generated from the plurality of streams based on the extracted features. Each cluster indicates a landmark depicted in the media of the cluster. The clusters are connected with directed edges. Each directed edge indicates a path from a first landmark to a second landmark based on the ordered sequence of images from each stream.

Still another embodiment includes a computer-readable storage medium storing instructions, which, when executed on a processor, perform an operation for generating a representation of activities occurring within a given location having one or more landmarks based on a collection of digital media. The operation itself includes generating, via a processor, a plurality of streams from the collection of media. Each stream corresponds to an ordered sequence of media captured by an individual over a given period of time. Features are extracted from one or more of the media in each stream. One or more clusters of the collection of the media are generated from the plurality of streams based on the extracted features. Each cluster indicates a landmark depicted in the media of the cluster. The clusters are connected with directed edges. Each directed edge indicates a path from a first landmark to a second landmark based on the ordered sequence of images from each stream.

Still another embodiment includes a system having a processor and a memory a memory storing one or more application programs configured to perform an operation for generating a representation of activities occurring within a given location having one or more landmarks based on a collection of digital media. The operation itself includes generating, via a processor, a plurality of streams from the collection of media. Each stream corresponds to an ordered sequence of media captured by an individual over a given period of time. Features are extracted from one or more of the media in each stream. One or more clusters of the collection of the media are generated from the plurality of streams based on the extracted features. Each cluster indicates a landmark depicted in the media of the cluster. The clusters are connected with directed edges. Each directed edge indicates a path from a first landmark to a second landmark based on the ordered sequence of images from each stream.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
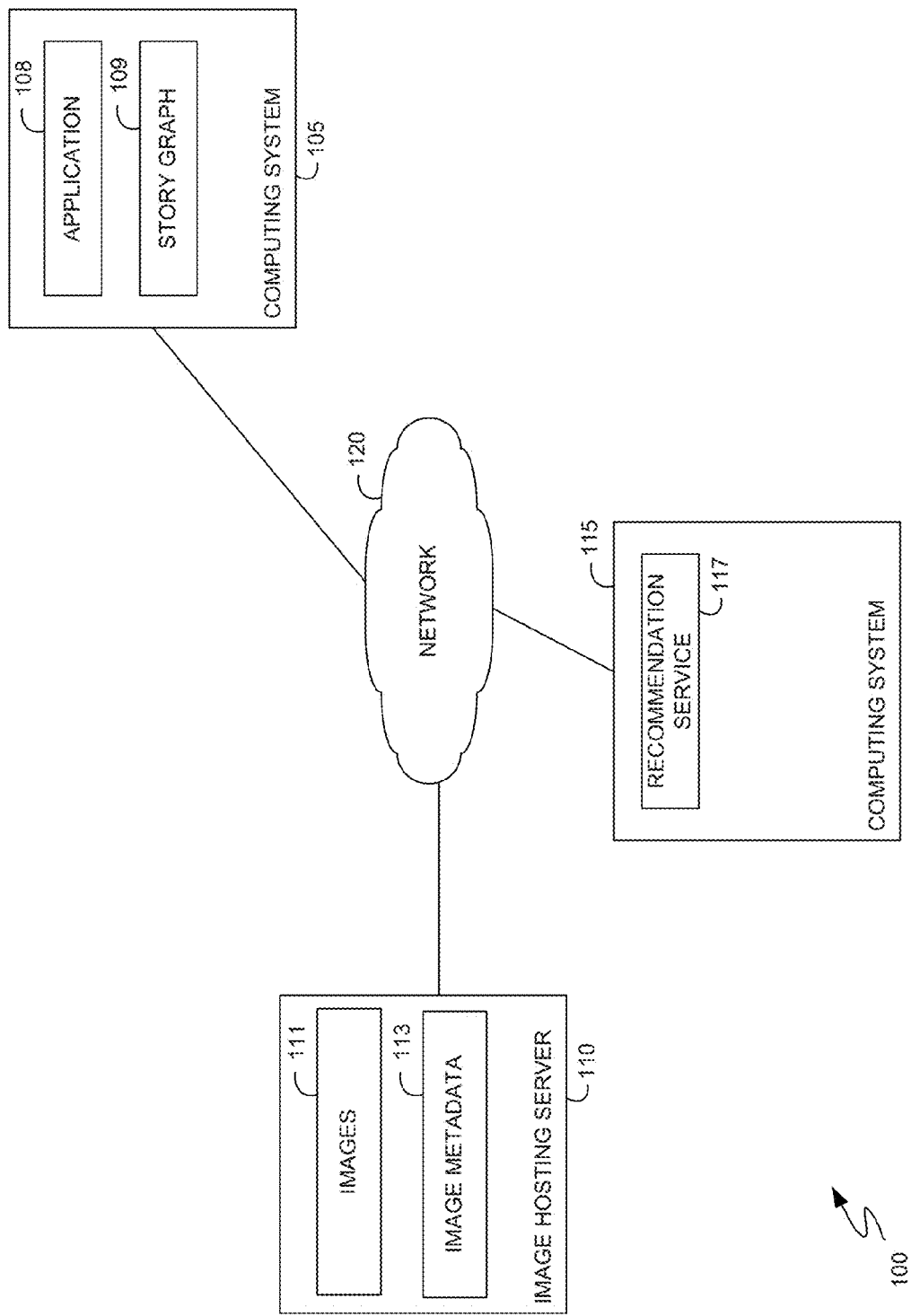
FIG. 1 illustrates an example computing environment, according to one embodiment.

Digital media captured by the public at large and posted to online sources store a wealth of information. Embodiments presented herein use this information to create a story graph, a representation presenting how people experience and move through a space. The story graph provides a mechanism for predicting what people will do by correlating their current location in a space with a predetermined story graph.

For example, given large collections of online photo collections that are shared by visitors to a theme park (or other public space) and publicly available information (e.g., a map of the park), a story graph provides an effective structural and visual summary of various events or activities that recur across photo sets. The story graphs may be structured hierarchically to enable users to explore stories between landmarks (e.g., locations and activities within the theme park, such as sets of attractions, dining, and entertainment) and sub-stories inside the individual landmarks. The story graphs are collective summarizations of experiences guests had in the park in the form of visual data that is contextualized in space and time. Such summarizations can be used in a number of different application scenarios. For example, users can explore popular paths between applications as well as common ways a guest may explore a particular attraction. As another example, given a source location or a current path, the story graphs may suggest a best next experience based on a time of day or demographics of the family. Story graphs may also be helpful in visualizing how guests tend to move throughout the park or in visualizing an evolution of experiences at a single attraction across time.

As noted, individuals frequently capture images of experiences (e.g., using smart phones, wearable media, and traditional digital cameras) and post images to social media websites to share these experiences with the public. For example, visitors to a theme park often take many digital images of attractions, characters, events, and so on. The visitors may upload the photographs to online services hosting digital images and video. Continuing the theme park example, theme parks often cater to diverse groups of visitors. Likewise, a visitor may enjoy the theme parks in various ways. Therefore, the path different visitors take through the theme park diverge depending on their individual preferences. For example, a couple with children may visit more family-oriented attractions than a couple on a date. As a result, digital photographs taken through the park by the couple with children may vary significantly from those taken by the couple on a date. Further, the path may also change based on time. For example, some attractions and events may only be available during a particular season. At the beginning of October, a theme park may introduce Halloween-based attractions.

However, although each collection of digital photos taken at a theme park represents a distinct experience of a particular individual at the theme park, in the aggregate, it is possible to ascertain common properties between collections, such as common or frequent paths and experiences visited by guests. Embodiments presented herein provide techniques for generating a story graph using digital images captured by many guests moving through a given space or location (e.g., a theme park). In one embodiment, a story graph generally provides a structure that visualizes various events and activities that recur across different photo streams (i.e., different users' collections of images). Generally, a story graph can be used to analyze how people move through a given space over time. As noted, a story graph may have a hierarchical structure. For example, an upper-level story graph could be defined to represent landmarks of a theme park (e.g., attractions and other locations). In such a case, a second level story graph could present a sequence of activities at the landmark.

In one embodiment, a story graph is generated by first retrieving a large amount of images for a given theme park. To do so, a software application may obtain images available from image hosting repositories and services. For example, an application could search for and download images tagged with the name of the theme park (or identified by GPS coordinates corresponding to the location of the theme park). Once obtained, the application generates photo streams based on user and timestamp metadata associated with each image. Generally, a photo stream is a set of images related to a common user that has been sorted sequentially. In each photo stream, the application identifies information from each image, such as facial features, time features, appearance features, and localization features. Doing so allows the application to generate clusters of images based on appearance and geographic position from distinct photo streams.

Each cluster provides a node in the story graph. The nodes provide a representation of a spatial experience, with each node corresponding to images captured from a similar location and having a coherent appearance. For example, a cluster may include multiple images taken at a particular attraction that have a distinguishable feature (e.g., a large mermaid statue, a costumed character, etc.) within view of each image. Another cluster may include images at the same attraction but focused on another distinguishable feature.

Once the application generates story graph, the application connects nodes with directed edges which represent progressions in a narrative of the story graph. That is, paths to other locations taken from a location are represented by edges. Connecting the nodes results in a story graph. In one embodiment, the application may optimize the story graph by removing weak edges between story graph nodes (i.e., edges representing paths present in only a limited number of photo streams).

In this example, the story graph provides an aggregated summary of probable guest actions in a theme park. This information can be used to support a variety of practical applications. For example, the story graph may be used to give visitors recommendations for attractions to visit in the theme park. For example, an application may present images from a story graph to a guest visiting a theme park. The guest selects an image taken at a particular location in the theme park and the story graph may be used to provide suggestions where the guest might visit within that location or other locations to visit based on what the story graph indicates with others. As another example, the story graph may be analyzed to determine a variety of useful information, e.g., such as what time of day that a given attraction tends to be busy.

Note, the following description relies on sets of digital photographs taken at a theme park as a reference example for generating story graphs. However, one of skill in the art will recognize that embodiments are applicable in other contexts related to visualizing various events, activities, and locales that recur in sequence across a large corpus of digital media (e.g., images, video, etc.) and metadata. For example, a story graph may be generated for sets of images taken by tourists in a city. For example, a story graph could be generated from images of Paris to determine insights about locations people commonly visit and what paths people take from a given location. As another example, a story graph could be generated for images taken at an annual convention. For instance, with the increasing popularity of comic book and video game conventions, a story graph generated for photos taken during conventions of previous years may allow organizers to estimate crowd volumes for certain panels and to reserve appropriate venue space as a result. Further, the techniques described herein may also apply to collections of video media captured by users. For example, a story graph may be generated using a collection of videos (or a combination of videos and images) taken by visitors at a theme park.

FIG. 1 illustrates an example computing environment 100, according to one embodiment. As shown, the computing environment 100 includes a computing system 105. The computing system 105 may be a physical computing system (e.g., a system in a data center) or may be a virtual computing instance executing within a computing cloud. The computing system 105 may include an application 108 and story graphs 109.

The computing environment 100 further includes an image hosting server 110. The image hosting server 110 provides a service that allows users to upload (e.g., via a web or mobile application interface) images 111, such as digital photographs, and share the images 111 with others. The image hosting server 110 stores the images 111 in a data store. The images 111 may include corresponding image metadata 113. Image metadata 113 may include user information, timestamp information, GPS location information, user-provided information (e.g., descriptions, keywords, etc.), and the like.

Visitors to a theme park may upload digital photos taken at a theme park to the image hosting server 110. Although the photos of each visitor may reflect a distinct experience, in the aggregate, common themes and experiences can be identified by analyzing the images of multiple photo streams.

In one embodiment, the application 108 generates a story graph 109 using collections of digital photographs taken by visitors at a theme park. A story graph 109 is a structure that presents a representation of events, locations, and activities at a location, in this case, a theme park, that recur across photo sets of multiple individuals. Each nodes of the story graph 109 corresponds to a cluster of similar images based on appearance features and physical location. For example, a node may correspond to a cluster of images taken at the lobby of an indoor dining area in the theme park. As another example, a node may correspond to a cluster of images taken at the entrance to a ride or other park attraction. Directed edges connect the nodes of the story graph 109 to reflect patterns of movement from one location (represented by one node) to another (represented by another node).

To generate the story graph 109 for the theme park, the application 108 first retrieves, via a network 120, images 111 and image metadata 113 corresponding to digital photographs taken by visitors of the theme park and uploaded to the image hosting server. In one embodiment, e.g., the application 108 queries an image hosting server 110 to identify images tagged with a theme park name (or attraction, character names). As another example, the application 108 queries the image hosting server 110 to identify images based on GPS metadata. Once retrieved, the application 108 separates images into user-centric photo streams based on user and timestamp metadata for each image. The application 108 localizes each image with respect to locations within the theme park and extracts semantic information from the image, such as facial, temporal, and spatial features of the image. Using the extracted information, the application 108 generates the story graph 109 by clustering like images of the multiple photo streams with one another to create nodes. The application 108 then performs maximum likelihood estimation for sparse time-varying directed graphs to generate an edge set for connecting the nodes.

In one embodiment, the story graph 109 may be structured hierarchically, e.g., into an upper-level story graph and lower-level story graphs. The upper-level story graph includes nodes representing landmarks. Each landmark may be its own lower-level story graph. A lower-level story graph includes nodes representing image clusters taken within a given landmark. For example, the upper-level story graph 109 may include nodes representing each of the attractions, events, and dining areas of the theme park. The upper-level story graph may present probable sequences and paths, expressed through directed edges connecting clusters of images taken through the theme park. Each lower-level story graph may present one of the attractions, such as a haunted house. A story graph for the haunted house may display sequences and paths, represented directed edges connecting images taken through the haunted house attraction.

Once generated, the story graph 109 has many practical applications, e.g., in event/attraction recommendation and temporal analysis. For example, a computing system 115 hosting a recommendation application/service 115 may use the story graph 109 to present visitors with suggested paths and attractions. A visitor using such a service may capture, i.e., via a smart phone, an image at the theme park, of the visitor. The visitor sends the captured image to the recommendation service 115 and, in response, the recommendation service 115 determines the visitor's location in the theme park—as well as a node in the story graph 109 corresponding to that location. The recommendation service 115 may suggest paths commonly taken by other visitors, as well as recommend activities observed at each landmark based on the information provided in the story graph 109. In addition, the recommendation service 115 may also identify timestamp metadata in the user-submitted image to suggest upcoming events taking place or other relevant information ascertained from the story graph 109. Also, the recommendation service 115 may leverage the timestamp metadata to identify attractions that become heavily occupied at a given time. With such information, the recommendation service 115 may suggest attractions that are less occupied.

Figure 2:
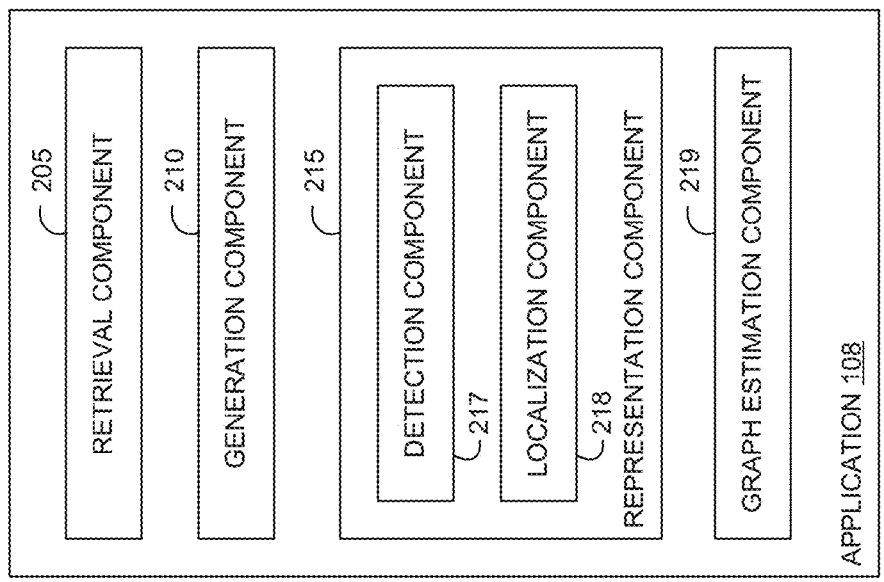
FIG. 2 illustrates the application depicted in FIG. 1, according to one embodiment.

FIG. 2 further illustrates the application 108 depicted in FIG. 1, according to one embodiment. As shown, the application 108 may include a retrieval component 205, a generation component 210, a representation component 215, and a graph estimation component 219.

In one embodiment, the retrieval component 205 downloads images from image repositories and hosting services, again, as a working example, images of a theme park. To do so, the retrieval component 205 may identify a name of the theme park, GPS coordinates, and the like in a query sent to the hosting service. Along with the images, the retrieval component 205 also downloads metadata corresponding to the images, such as user information, timestamp information, GPS location information (if available), and so on. Further, the retrieval component 205 also obtains information about the theme park (e.g., maps provided by the park, photos related to each attraction, etc.) through similar methods. The application 108 uses such information in localizing user images, i.e., determining the physical location of where an image was taken.

The generation component 210 separates the image collections by into photo streams based on user and timestamp metadata. A photo stream corresponds to a set of images taken in sequence by an individual within a specified period (e.g., one day). A photo stream may be expressed as:

$$P^n = \{I_1, \ldots, I_{N_n}\} \tag{1},$$

where $N_n$ is the number of images I in $P^n$. In one embodiment, the generation component 210 may discard photo streams with an amount of images that fails to reach a specified threshold. In practice, a minimum threshold of thirty images has shown to be useful. Further, the generation component 210 may also discard images based on other criteria, such as lack of image quality, lack of diversity between images, etc.

In one embodiment, the representation component 215 extracts low-level and high-level features of each image of a photo stream and defines the features into vector representations. To obtain low-level features, the representation component 215 uses known techniques, such as dense feature extraction with vector quantization. For instance, the representation component 215 extracts HSV color SIFT (Scale Invariant Feature Transform) and HOG (Histogram of Oriented Edge) features on a regular grid of each image. The representation component 215 may generate visual words for each feature type through a K-means clustering algorithm to randomly selected descriptors. A nearest word is assigned to each node within the grid. An image descriptor vector v is a concatenation of spatial pyramid histograms of the color SIFT and HOG features. Of course, one of skill in the art will recognize that other approaches for extracting image features may be used as well.

The representation component 215 may include a detection component 217 and a localization component 218. The detection component 217 and localization component 218 extract high-level semantic features of an image. The detection component 217 extracts facial features and time features from the image. Further, the detection component 217 extracts, from the images, supporting object features (e.g., theme park ride cars, food, parade floats, etc.) that may be used to illustrate main events occurring within each image. For example, the detection component 217 may detect facial features using techniques where bounding boxes containing faces are returned with along with scores indicating the confidence of the facial features being accurately captured by the bounding box. The detection component 217 may then generate histograms for face areas, face locations, and pair-wise face distances for each image. The detection component 217 concatenates the histograms to define a set of feature vectors. The feature vectors are later used in defining nodes of the story graph, as described further below.

Further, the detection component 217 may extract time features using timestamp information of an image. In one embodiment, the detection component 217 relies on month and hour information due to events at the theme park typically being periodic on a seasonal and daily basis.

In addition, the detection component 217 also extracts supporting object features and regions of interest from each image. Again using a theme park as a reference example, supporting objects and regions of interest may include theme park ride cars, food, and parade floats within an image. For example, to extract the features, the detection component 217 may sample bounding boxes using a known objectness metric algorithm. The detection component 217 disregards bounding boxes that largely overlap with bounding boxes used in the facial detection techniques described above. The detection component 217 may sample a specified amount of bounding boxes with the highest objectness scores and build similarity graphs using a histogram intersection on the SIFT and HOG low-level features. The detection component 217 may then use diversity ranking and clustering algorithms to determine portions of the image that most correspond to supporting objects.

Further, because guest activities depend on what landmarks a guest visits, the story graph 109 relies on image localization, i.e., determining a location of where a given image was captured by a guest. To localize each image, the localization component 218 determines probability distributions for theme park landmarks for the image. The localization component 218 does so relative to a photo stream since each photo stream corresponds to images captured by different users. The localization component 218 may use a Conditional Random Field (CRF) model to infer a conditional distribution over the landmark labels of a given photo stream. And because each photo stream is a time-ordered sequence of images, the localization component 218 may model the distribution by a linear-chain CRF. The conditional probability of landmark labels c given a photo stream $P^n$ is may be expressed as:

$$\log P(c|P^n) = \Sigma_i \psi(c_i, I_i) + \pi(c_i, I_i) + \lambda(c_i, I_i) + \phi(c_0) \Sigma_i \phi(c_i, c_{i+1}, \Delta_i) - \log Z(P^n) \quad (2),$$

where $Z(P^n)$ is a partition function.

The localization component 218 may also determine an appearance potential of a given image in a photo stream. The appearance potential includes a likelihood that the image is visually associated with a particular landmark. In one embodiment, the localization component 218 may determine the appearance potential by summing scores of a k-nearest neighbor (KNN) classifier and a linear support vector machine (SVM) with a combination of kernels taken from image features. With a linear SVM, the localization component 218 learns multiple classifiers per landmark to account for multiple views of the landmark.

The localization component 218 may also determine a GPS potential of a given image in a photo stream. GPS information may be available for a number of images in the photo stream. For these images, the localization component 218 defines GPS potentials as a normal distribution:

$$\pi(c_i^l, I_i) = N(x_c^l; x_i, \sigma) \quad (3),$$

where $x_c^l$ and $x_i$ are GPS coordinates of a landmark l and image $I_i$ respectively. Further, the localization component 218 may set a standard deviation $\sigma$ (e.g., $\sigma=0.07$ km has shown to be effective), such that if a landmark is $3\sigma$ away from the GPS location of the image, the localization component 218 is unlikely to assign the landmark to $I_i$.

The localization component 218 may also determine a text potential for images that provide text information. Doing so allows the application 108 to leverage the text information when available. The text potential $\lambda(c_i^l, I_i)$ of an image to a landmark may be expressed as:

$$\lambda(c_i^l, I_i) = \Sigma_{q \in q_i} tf_{q,i} \times idf_q \quad (4),$$

The localization component 218 may also determine an edge potential that indicates a likelihood that a pair of consecutive images $I_i$ and $I_{i+1}$ are associated with a landmark l and m respectively, given a $\Delta_k$ that denotes an elapsed time between the two images. To do so, the localization component 218 builds a connectivity graph $g_c = (\mathcal{L}, \mathcal{E}_c)$ based on the theme park map and GPS coordinates of the landmarks, where $\mathcal{L}$ is a set of landmarks and $\mathcal{E}_c$ are edges of the connectivity graph. Each landmark in $\mathcal{L}$ is linked to its nearest landmarks in all directions, and the edge weight is given by the walking time between a landmark pair. The walking time may be determined by dividing the distance by human walking speed $s_w$ (e.g., $s_w=1$ km/h has shown to be effective). The localization component 218 uses a Gaussian model to compute a transition likelihood from landmark l to m as $$\phi(c_i^l, c_i^m, \Delta_i) = \frac{1}{\sigma\sqrt{2\pi}} \exp\left(-\frac{\Delta_i^2}{2\sigma^2}\right), \text{ where } \sigma = s_w \Delta_i. \quad (5)$$

In this model, $\sigma$ is proportional to $\Delta_i$. That is, with a longer $\Delta_i$, farther landmarks may be reachable.

The graph estimation component 219 constructs a story graph $\mathcal{G} = (O, \mathcal{E})$ from a set of photo streams $\mathcal{P}$. To do so, the graph estimation component 219 clusters similar images in the aggregate of photo streams for each landmark and connects the clusters based on observed sequences. The graph estimation component 219 concatenates feature vectors extracted by the detection component 217. The graph estimation component 219 then generates a similarity matrix between the images by applying a histogram intersection to the features. Further, the graph estimation component performs diversity ranking and clustering algorithms to form the image clusters. Note, a variety of clustering algorithms may be applied to form the image clusters.

Further, the graph estimation component 219 connects the clusters using directed edges. A cluster connected to another cluster by a directed edge indicates a progression of travel depicted in photo streams. Each directed edge may be weighted to represent a probability that the connected clusters sequentially co-occur across many photo streams. That is, the edges may indicate that different photo streams may provide a similar progression from node to node. The edge set is sparse to avoid weaker connections (i.e., directed edges having relatively low weights) between clusters. In addition, the edge set may include two groups, one group of representing edges within a landmark, and another group representing edges between landmarks. This allows the story graph to be structured into an upper-level (i.e., a graph defined between landmarks) and a lower-level (i.e., a graph defined within a landmark). The graph estimation component 219 may solve a maximum likelihood estimation to determine the most likely edge set, given the photo streams as input. To do so, the graph estimation component 219 employs a Markovian assumption between consecutive images in each photo stream $P^n = \{I_1, \ldots, I_{N_n}\}$. As a result of the image clustering above, each image is associated with a vertex membership vector $x_i \in \mathbb{R}^M$, which has only a single nonzero element $x(o) = 1$ if the image is a member of vertex $o$. Because photo streams are generated independently of one another, the likelihood of an observed set of photo streams $\mathcal{P}$ may be factorized as:

$$f(\mathcal{P}) = \Pi_{i=1}^N f(P^n), \text{ where } f(P^n) = \Pi_{x_i \in P^n} f(x_i | x_{i-1}) \quad (6).$$

For the transition model $f(x_i | x_{i-1})$, the graph estimation component 219 may use a linear dynamics model, expressed as:

$$x_i = Ax_{i-1} + \epsilon, \text{ where } \epsilon \sim \mathbb{N}(0, \sigma^2 I) \quad (7)$$

where $\epsilon$ is a vector of Gaussian noise with zero mean and variance $\sigma^2$. Therefore, the estimation of an edge structure of the story graph reduces to infer an optimal transition matrix $A^*$. All elements of A have a nonnegative value, and as $A(x, y) \to 0$, the transition between x and y is very unlikely. Since vertex o is the only nonzero element of the vector x, $f(x_i | x_{i-1}) = f(x_{i,o} | x_{i-1})$. Consequently, based on Eq. (7), the transition likelihood may be expressed as a Gaussian distribution: $f(x_{i,o} | x_{i-1}) = \mathbb{N}(x_{i,o}; A_{m^*} x_{i-1})^2$, where $A_{m^*}$ denotes the m-th row of the matrix A. Thus, the log-likelihood log $f(\mathcal{P})$ in Eq. (6) may be expressed as:

$$\log f(\mathcal{P}) = -\sum_{n=1}^{N} \sum_{x_i \in P^n} f(x_{i,o} | x_{i-1}), \quad (8)$$

where $$f(x_{i,o} | x_{i-1}) = \left(\frac{N^n}{2} \log(2\pi\sigma^2) + \frac{1}{2\sigma^2}(x_{i,o} - A_m * x_{p(i)})^2\right).$$

In one embodiment, the graph estimation component 219 may optimize the story graph 109 by removing edges between clusters that correspond to relatively weak connections. To do so, the graph estimation component 219 discovers nonzero elements of the matrix A as well as associated weights by maximizing the log-likelihood of Eq. 8. Such a function may be expressed as:

$$\hat{A}_{m^*} = \operatorname{argmin} \Sigma_{n=1}^N \Sigma_{I_i \in P^n} w(i)(x_{i,o} - A_m * x_{p(i)})^2 + \lambda \|A_{m^*}\| \quad (9).$$

Eq. 9 allows the graph estimation component 219 to estimate the graph by independently solving a set of atomic weighted lasso problems for each vertex m. Doing so allows the optimization to be trivially parallelizable per vertex in the story graph.

In one embodiment, the graph estimation component 219 may personalize a story graph 109 for a particular user (e.g., a family of four, a child, a couple, etc.) so that the story graph 109 reflects the demographic of the user. To do so, the graph estimation component 219 may uses a weighting $w(i)$ for individual images $I_i$ based on factors such as user and time metadata. Because transitions between landmarks can change over time, an individual $A^t$ may be inferred every thirty minutes while changing t from a given period of time (e.g., from 10:00 AM to 8:00 PM) to densely capture time-varying story graphs. Further, the weighting $w(i)$ allows the graph estimation component 219 to estimate $A^t$ by re-weighting observation data near t. That is, if the time-stamp of $I_i$ is close to t, $w^t(i)$ is large so that the observation contributes more on the graph estimation at t. This may be defined as:

$$w^t(i) = \frac{\kappa_h(t - t_i^l)}{\sum_{n=1}^{N} \sum_{i=1}^{N^n} \kappa_h(t - t_i^l)}, \kappa_h(u) = \frac{\exp\left(-\frac{u^2}{2h^2}\right)}{\sqrt{2\pi} h}, \quad (10)$$

where $\kappa_h(u)$ is a Gaussian symmetric nonnegative kernel function and h is the kernel bandwidth. After obtaining the nonzero elements of A by solving Eq. 9, the graph estimation component 219 estimates actual associated weights by re-solving a least-square estimation using only the survived nonzero elements of the graph.

Figure 3:
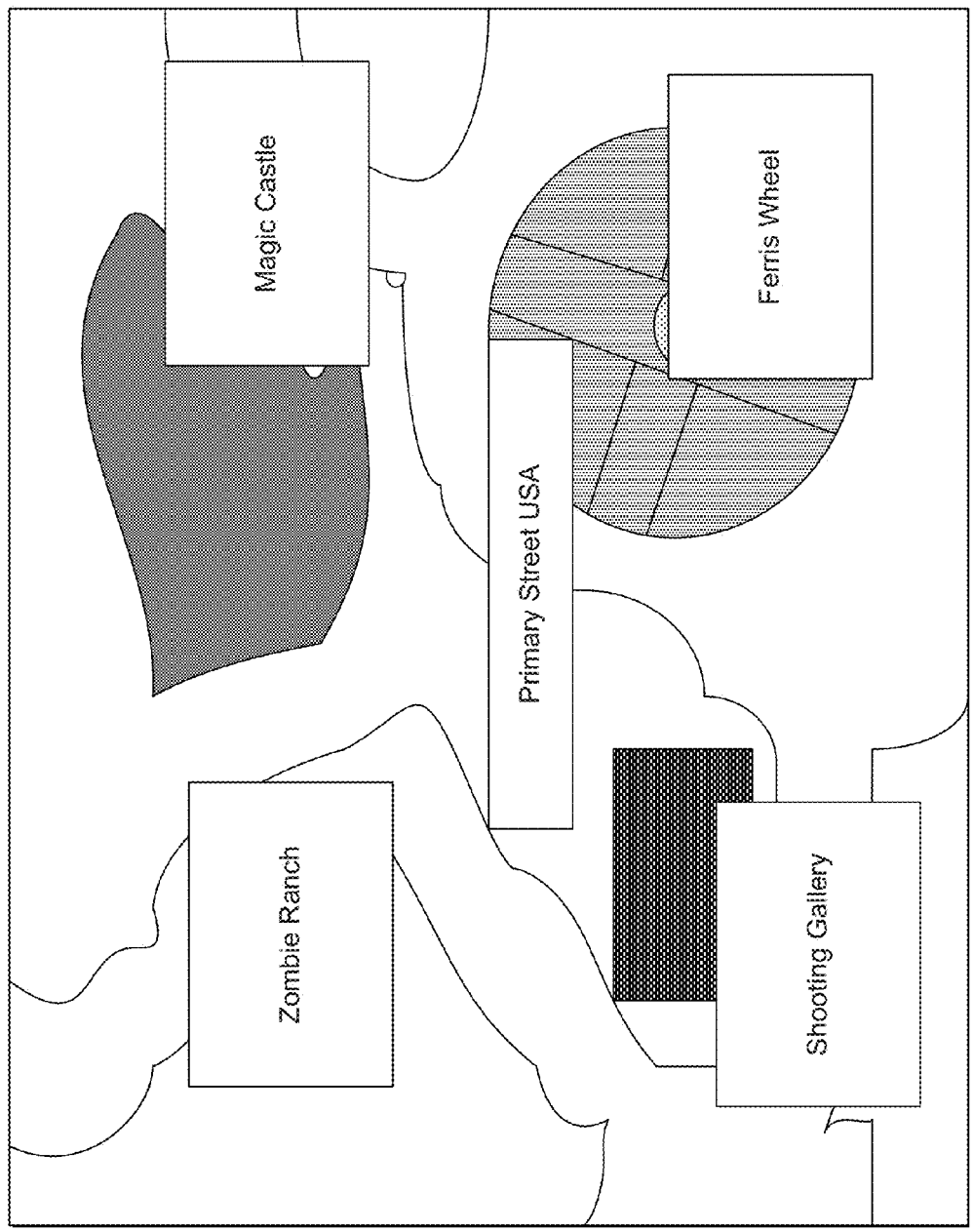
FIG. 3 illustrates an example theme park map used to localize images of a photo stream, according to one embodiment.

FIG. 3 illustrates an example of a theme park map used to localize images of a photo stream, according to one embodiment. As stated, the retrieval component 205 may obtain the theme park map as well as other information related to the theme park to identify landmarks throughout the theme park. The application 108 may localize photo stream images relative to the defined landmarks. Illustratively, the theme park map specifies the locations of multiple landmarks throughout the theme park (e.g., Zombie Ranch, Magic Castle, Primary Street USA, Shooting Gallery, and Big Star Wheel).

For instance, once landmarks are identified, the retrieval component 205 may download images related to each landmark from image hosting services and repositories. Doing so allows the localization component 218 to evaluate images in each photo stream with respect to the defined landmarks and corresponding images. The localization component 218 may determine a location of where each of the images were taken relative to the landmarks.

An upper-level story graph eventually generated by the application 108 may include nodes corresponding to image clusters of each landmark shown in the theme park map, with edges representing possible sequences and paths through each landmark in the theme park. Further, each node in the upper-level story graph 109 is contains a lower-level sub-story graph which specifies, through clusters of images, sequences of activities and events at that landmark.

Figure 4:
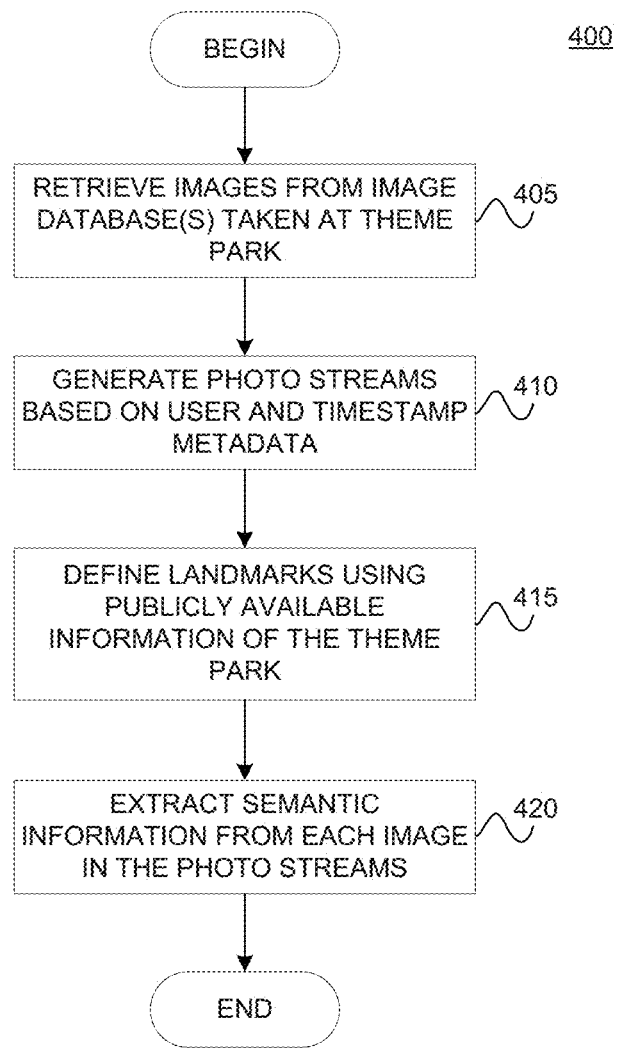
FIG. 4 illustrates a method for classifying photo streams used in story graphs, according to one embodiment.

FIG. 4 illustrates a method 400 for classifying photo streams used in story graphs, according to one embodiment. Method 400 begins at step 405, where the retrieval component 205 obtains collections of images related to the theme park. To do so, the retrieval component 205 may download the images from an image repository service that allows users to upload digital photos. The each image may include various metadata, such as user information, timestamp information, and GPS information, if available. Further, the user may tag images with other metadata, such as a description, and keywords. The tags may provide hints or indicators of where the photo was taken. For example, a user may include a tag that specifies the name of the theme park. Therefore, the retrieval component 205 may identify images related to the theme park by searching for images tagged with the name of the theme park.

At step 410, the generation component 210 creates photo streams from the obtained image set. To do so, the generation component 210 separates the image set using the metadata provided with the images. Further, the generation component 210 sorts each photo stream using the timestamp metadata provided in the images. Thus, each photo stream represents a collection of digital images taken in sequence by a given individual. The generation component 210 discards photo streams having an amount of images below a specified threshold (e.g., thirty images has proven to be a sufficient minimum).

At step 415, the application 108 identifies landmarks of the theme park. As stated, the landmarks indicate separate attractions, dining areas, and other entertainment (e.g., parades and stage shows) having coherent themes. The application 108 may identify such landmarks using available information, such as park maps. Once identified, the retrieval component 205 obtains images for each landmark from a public image repository service (e.g., by searching for images having the landmark name in a description). Further, the retrieval component 205 may also obtain GPS coordinates for each landmark, e.g., by querying the landmark in an online mapping service application.

At step 420, the representation component 215 extracts semantic information from the images in each photo stream. As noted, examples of semantic information may include facial features, time features, location features, and supporting object features in each image.

Figure 5:
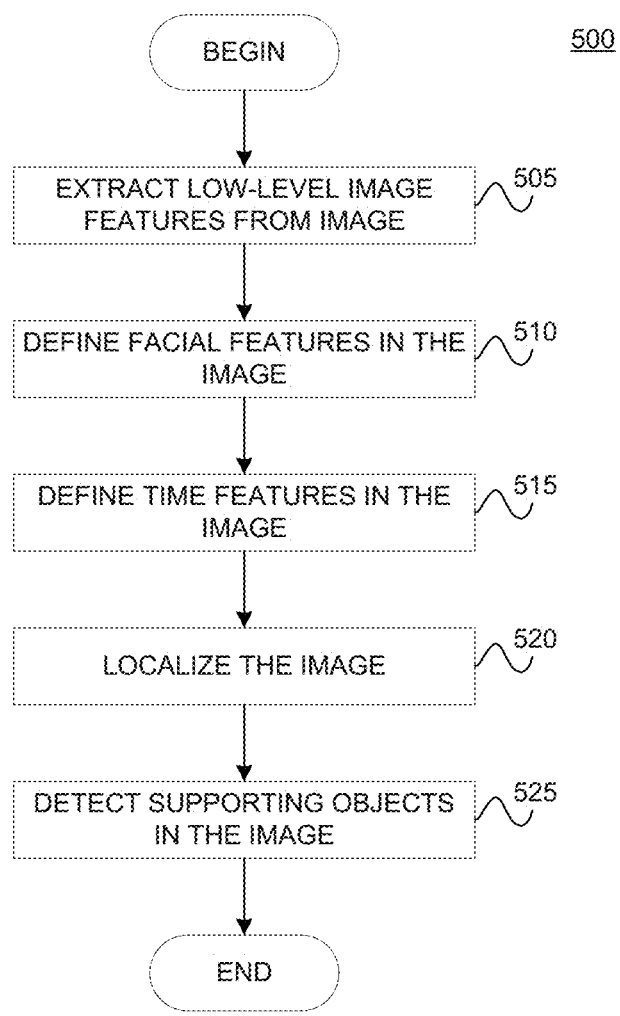
FIG. 5 illustrates a method for extracting semantic information from photo streams, according to one embodiment.

FIG. 5 illustrates a method 500 for extracting features from images in a photo stream, according to one embodiment. In one embodiment, prior to constructing story graphs, the application 108 builds a representation of each image using low-level features and high-level semantic descriptions. Method 500 begins at step 505, the representation component 215 extracts low-level features of each image. In one embodiment, the representation component 215 does so using dense feature extraction with vector quantization techniques (e.g., K-means clustering).

At step 510, the detection component 217 defines facial features within each image of a given photo stream. To do so, the detection component 217 may use known techniques that result in bounding boxes containing facial features with confidence scores. Further, the detection component 217 computes facial features, e.g., by generating histograms, for face areas, locations, and pairwise face distances.

At step 515, the detection component 217 identifies time features from each image in a given photo stream. In one embodiment, the detection component 217 obtains month and hour information to account for theme park events generally being organized on a daily and seasonal basis.

At step 520, the localization component 218 determines a location of where each image in a given photo stream was taken, relative to the identified landmarks. In one embodiment, the localization component 218 uses a Conditional Random Field (CRF) model to determine a conditional distribution over landmarks relative to the photo stream. In practice, the localization component 218 may use a linear-chain CRF due to the photo stream being organized in sequence by time.

At step 525, the detection component 217 identifies supporting objects within each image in a given photo stream. Examples of supporting objects may include rides, distinct structures, food, fireworks, etc. The detection component 217 may use techniques known in the art, such as objectness metrics and clustering algorithms to identify supporting objects.

The extracted low-level features may be represented as vector v. The extracted semantic features of a given image may be represented as four sets of vectors {faces, time, location, supporting objects}, or {f, c, t, o}.

Figure 6:
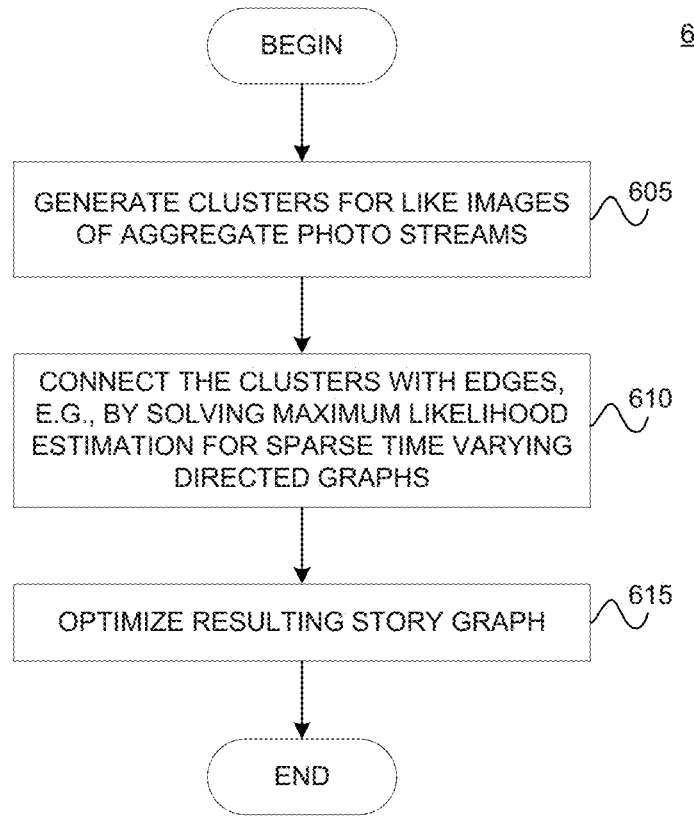
FIG. 6 illustrates a method for generating a story graph using photo streams, according to one embodiment.

FIG. 6 illustrates a method 600 for generating a story graph using photo streams, according to one embodiment. Method 600 begins at step 605, where the graph estimation component 219 generates clusters of like images for the aggregate of photo streams for each landmark. The graph estimation component 219 concatenates vectors {v, f, o, t}. By including the vector o for supporting objects, the graph estimation component 219 encourages pairs of images with similar supporting objects to be clustered together. The graph estimation component 219 generates a similarity matrix between images by applying histogram intersection to {v, f, o, t}. Further, the graph estimation component 219 applies diversity ranking and clustering algorithms to detect exemplars and clusters.

At step 610, the graph estimation component 219 connects the clusters with directed edges based on observed sequences. To do so, the graph estimation component 219 may perform a maximum likelihood estimation over an adjacency matrix for the set of directed edges. That is, the graph estimation component 219 estimates the most likely adjacency matrix that results for the photo streams.

Connecting edges to the nodes results in an initial story graph. At step 615, the graph estimation component 219 may optimize the story graph by removing edges corresponding to weak associations between nodes. To do so, the graph estimation component 219 may perform lasso regularization on the adjacency matrix of the edge set generated for the initial story graph.

Figure 7:
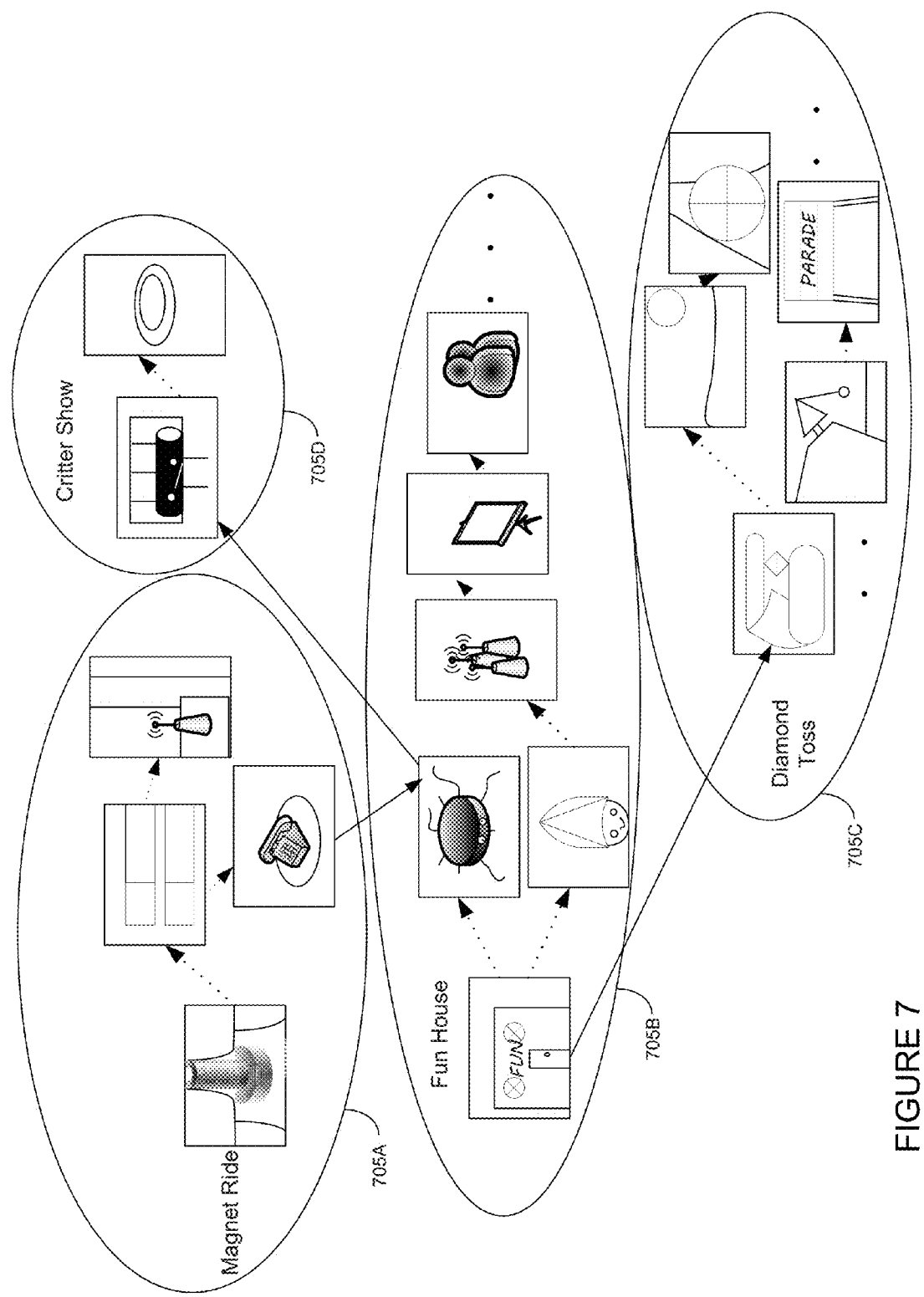
FIG. 7 illustrates an example sub-graph of a story graph, according to one embodiment.

FIG. 7 illustrates an example portion of an upper-level story graph, according to one embodiment. Illustratively, the story graph depicts nodes 705A-D of landmarks "Magnet Ride," "Fun House," "Diamond Toss" and "Critter Show" within a theme park. Each node 705 represents a cluster of images taken within given landmark. Each node may include lower-level story graphs that themselves include nodes representing locations, activities, and events within the landmark. Illustratively, solid-lined arrows represent inter-landmark edges, and dotted-lined arrows represent edges inside a landmark. The edges may depict common progressions through the theme park based on spatial and temporal properties of images in the story graph.

Figure 8:
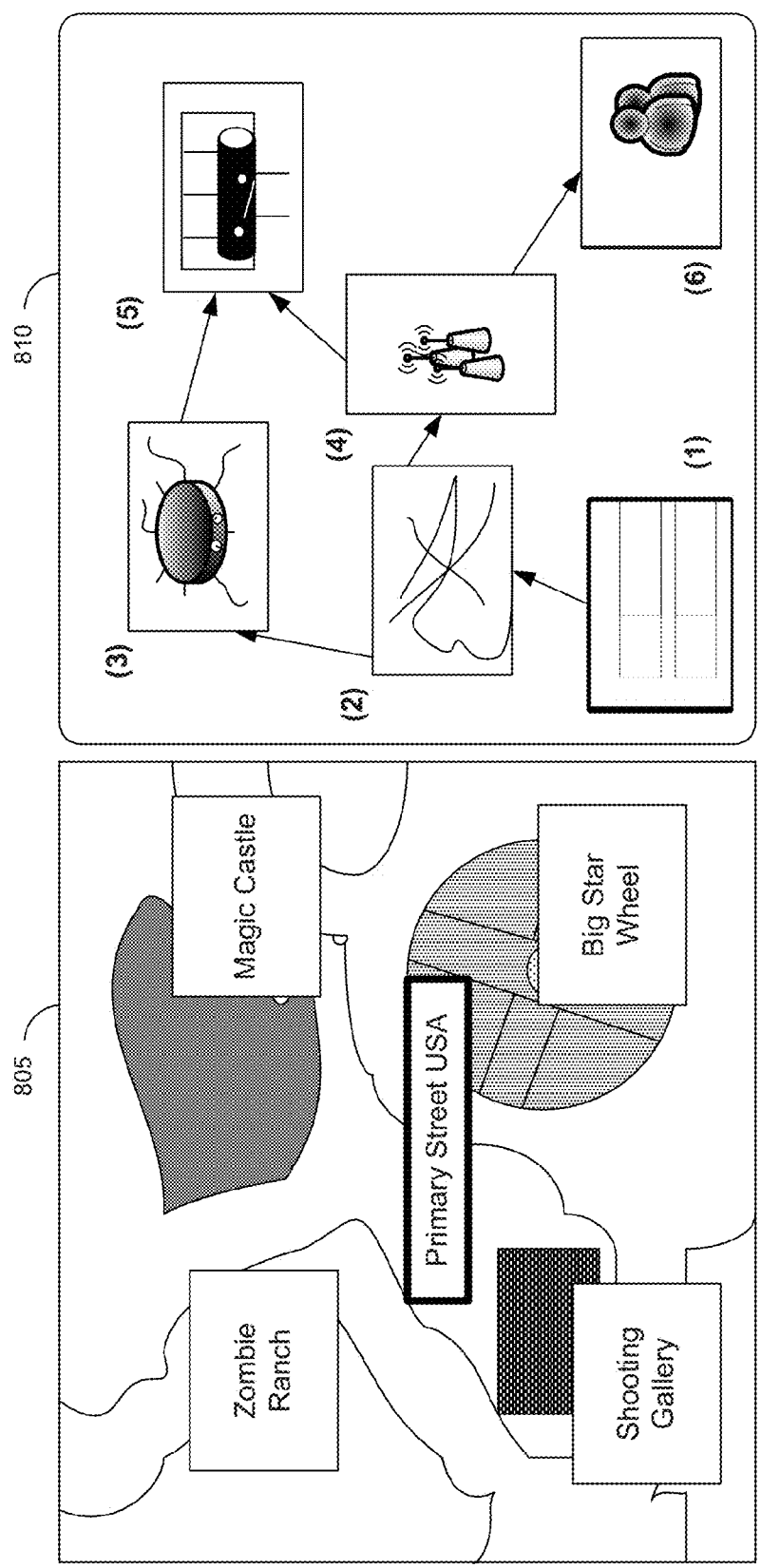
FIG. 8 illustrates an example of a story graph interface used to recommend theme park attractions to a visitor of the theme park, according to one embodiment.

FIG. 8 illustrates an example of a story graph interface used to recommend theme park attractions to a visitor of the theme park, according to one embodiment. The interface allows a user to view a current landmark as well nearby landmarks that are commonly visited after visiting the current landmark. The left panel 805 presents a map of the theme park with names of available attractions at each respective location. Illustratively, a bolded rectangle surrounds the "Primary Street USA" attraction. The bolded rectangle represents a currently selected landmark. The right panel 810 presents a lower-level story graph for the currently selected landmark, i.e., Primary Street USA. Each image in the right panel 810 illustrates a representative image of a particular node, e.g., a location within the landmark, in the story graph. Each directed edge represents a possible progression from one location to another location.

Figure 9:
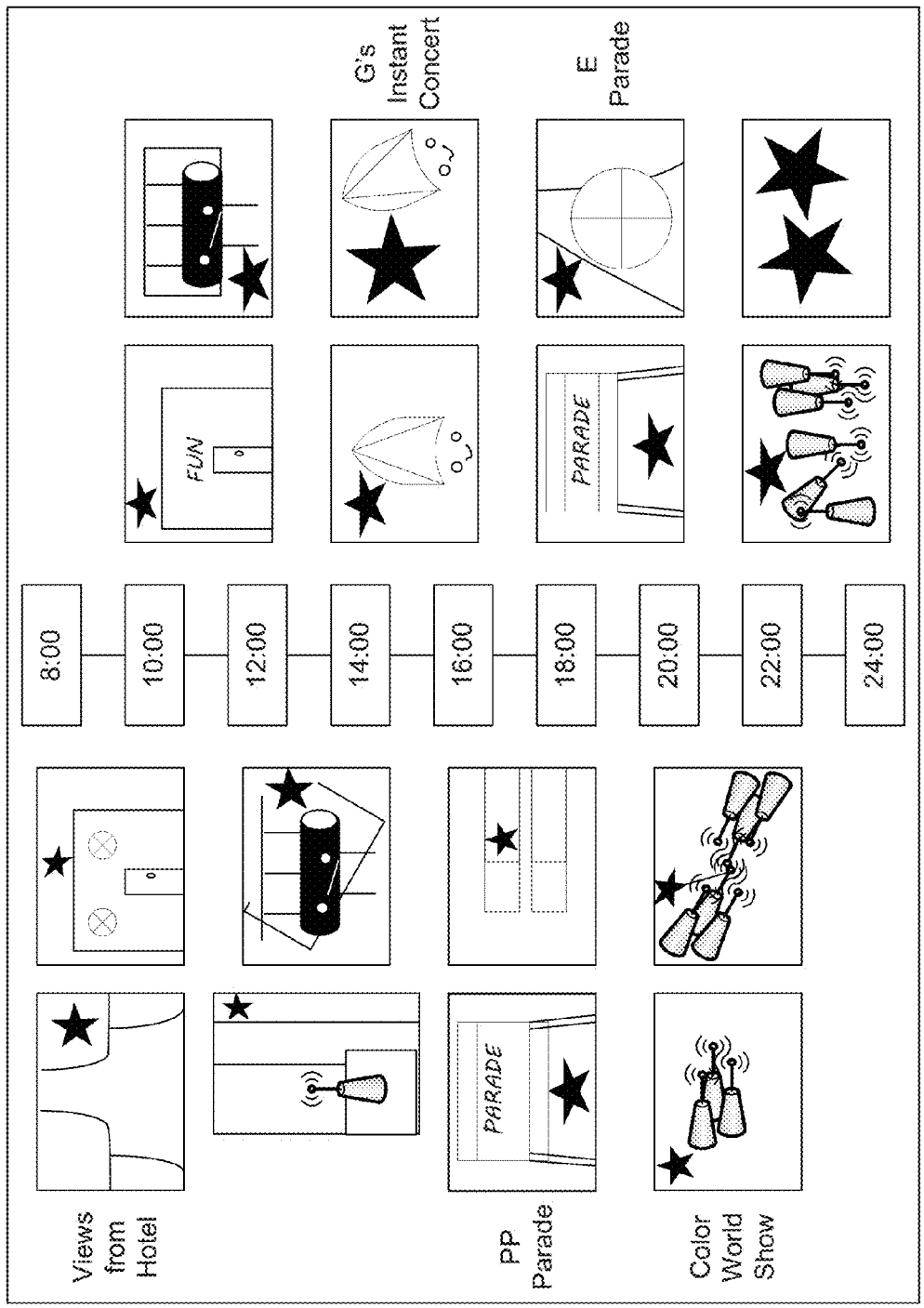
FIG. 9 illustrates an example of a story graph interface used to provide temporal analysis for a user, according to one embodiment.

FIG. 9 illustrates an example of a story graph interface used to provide temporal analysis for a user, according to one embodiment. In this example, the interface retrieves image data from a generated story graph and presents two images taken at or around a particular landmark at two-hour intervals. The two images represent the most common images captured by guests at the landmark at a given time. This case reflects that a variety of events at the theme park may occur at different times during the day (or other period).

Figure 10:
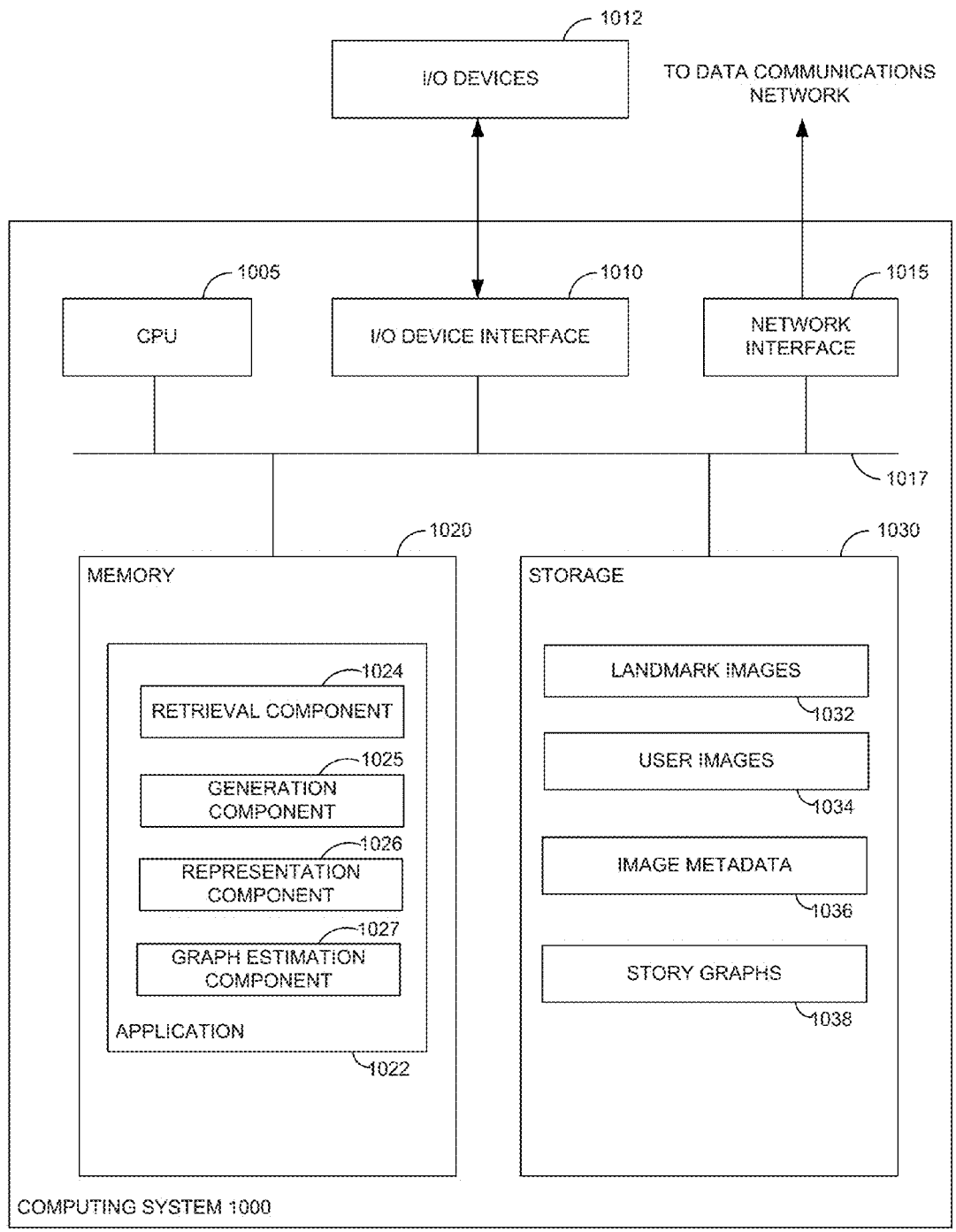
FIG. 10 illustrates a computing system configured to generate a story graph using collections of digital photographs, according to one embodiment.

FIG. 10 illustrates a computing system 1000 configured to generate a story graph for a theme park using collections of digital photographs taken at the theme park, according to one embodiment. As shown, the computing system 1000 includes, without limitation, a central processing unit (CPU) 1005, a network interface 1015, a memory 1020, and storage 1030, each connected to a bus 1017. The computing system 1000 may also include an I/O device interface 1010 connecting I/O devices 1012 (e.g., keyboard, display and mouse devices) to the computing system 1000. Further, in context of this disclosure, the computing elements shown in the computing system 1000 may correspond to a physical computing system (e.g., a system in a data center) or may be a virtual computing instance executing within a computing cloud.

CPU 1005 retrieves and executes programming instructions stored in memory 1020 as well as stores and retrieves application data residing in the storage 1030. The bus 1017 is used to transmit programming instructions and application data between CPU 1005, I/O devices interface 1010, storage 1030, network interface 1015, and memory 1020. Note, CPU 1005 is included to be representative of a single CPU, multiple CPUs, a single CPU having multiple processing cores, and the like. Memory 1020 is generally included to be representative of a random access memory. Storage 1030 may be a disk drive storage device. Although shown as a single unit, storage 1030 may be a combination of fixed and/or removable storage devices, such as fixed disc drives, removable memory cards, or optical storage, network attached storage (NAS), or a storage area-network (SAN).

Illustratively, memory 1020 includes an application 1022. And storage 1030 includes landmark images 1032, user images 1034, image metadata 1036, and story graphs 1038. The application 1022 generates story graphs 1038 using large collections of user images 1034. The story graphs 1038 represent common sequences of activities and events at the theme park.

The application 1022 further includes a retrieval component 1024, generation component 1025, representation component 1026, and a graph estimation component 1027. The retrieval component 205 downloads collections of user images 1034 taken at the theme park as well as landmark images 1032 corresponding to landmarks at the theme park from public image repositories and hosting services. In addition, the retrieval component 205 obtains image metadata 1036 corresponding to each of the user images and landmark images 1032.

The generation component 1025 creates photo streams from the user images 1034 based on user and timestamp metadata. The photo streams each correspond to a collection of photos taken by a user within a specified period of time, e.g., one day. The representation component 1026 defines low-level and high-level features of each of the user images 1034. The graph estimation component 1027 generates nodes and edges of the story graph 1038 based on the defined features. The nodes correspond to clusters of similar images (e.g., based on location, facial features, supporting objects, etc.). Directed edges connect the nodes to reflect a common sequence between the nodes (i.e., based on location and temporal properties).

As described, embodiments presented herein provide techniques for generating a story graph structure using large collections of digital photos to visualize activities and events as individuals move through a particular space (e.g., a theme park, tourist city, etc.). Advantageously, the story graphs aggregate experiences (i.e., presented in photos) of multiple individuals to show locations within the space that the individuals commonly visit in sequence from one point to another. As a result, the story graphs provide insight that may benefit practical applications, such as in locale recommendations and temporal analysis.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be used. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present disclosure, the application 108 could execute on a computing system in the cloud and generate story graph structures for collections of digital photographs for a theme park. In such a case, the application 108 could generate photo streams based on user and timestamp metadata and define features of each image in the photo streams. The application 108 could cluster similar images and define edges based on a relative sequence of the images. The resulting story graph may also be hosted on a computer system in the cloud. If story graph input (i.e., images used to generate the story graph) increases, additional storage capacity may easily be provisioned in the cloud.

While the foregoing is directed to embodiments of the present invention, other and further embodiments of the invention may be devised without departing from the basic scope thereof, and the scope thereof is determined by the claims that follow.

What is claimed is:

1. A method for generating a representation of activities occurring within a given location having one or more landmarks based on a collection of digital media, the method comprising:
generating, via a processor, a plurality of streams from the collection of media, each stream corresponding to an ordered sequence of media captured by an individual over a given period of time;
for each stream, extracting features from one or more of the media in the stream;
generating, from the plurality of streams, one or more clusters of the collection of the media based on the extracted features, wherein each cluster indicates a landmark depicted in the media of the cluster; and
connecting clusters with directed edges, wherein each directed edge indicates a path from a first landmark to a second landmark based on the ordered sequence of images from each stream, wherein the clusters and the directed edges are defined hierarchically, and wherein the directed edges are weighted based on a probability that connected clusters co-occur sequentially across one or more of the streams.

2. A method for generating a representation of activities occurring within a given location having one or more landmarks based on a collection of digital media, the method comprising:
generating, via a processor, a plurality of streams from the collection of media, each stream corresponding to an ordered sequence of media captured by an individual over a given period of time;
for each stream, extracting features from one or more of the media in the stream;
generating, from the plurality of streams, one or more clusters of the collection of the media based on the extracted features, wherein each cluster indicates a landmark depicted in the media of the cluster;
connecting clusters with directed edges, wherein each directed edge indicates a path from a first landmark to a second landmark based on the ordered sequence of images from each stream; and
presenting recommendations to a guest at a theme park for activities, events, and attractions to visit based on the connected clusters.

3. The method of claim 2, further comprising, removing directed edges having a low weight determined based on a maximum likelihood estimation.

4. The method of claim 2, further comprising, modifying a weight of each directed edge based on a function of time.

5. A system, comprising:
a processor; and
a memory storing one or more application programs configured to perform an operation for generating a representation of activities occurring within a given location having one or more landmarks based on a collection of digital media, the operation comprising:
generating a plurality of streams from the collection of media, each stream corresponding to an ordered sequence of media captured by an individual over a given period of time,
for each stream, extracting features from one or more of the media in the stream,
generating, from the plurality of streams, one or more clusters of the collection of the media based on the extracted features, wherein each cluster indicates a landmark depicted in the media of the cluster,
connecting clusters with directed edges, wherein each directed edge indicates a path from a first landmark to a second landmark based on the ordered sequence of images from each stream, wherein the clusters and directed edges are defined hierarchically, and wherein the directed edges are weighted based on a probability that connected clusters co-occur sequentially across one or more of the streams, and
removing directed edges having a low weight determined based on a maximum likelihood estimation.

6. A system, comprising:

a processor; and a memory storing one or more application programs configured to perform an operation for generating a representation of activities occurring within a given location having one or more landmarks based on a collection of digital media, the operation comprising:

generating a plurality of streams from the collection of media, each stream corresponding to an ordered sequence of media captured by an individual over a given period of time, for each stream, extracting features from one or more of the media in the stream, generating, from the plurality of streams, one or more clusters of the collection of the media based on the extracted features, wherein each cluster indicates a landmark depicted in the media of the cluster, connecting clusters with directed edges, wherein each directed edge indicates a path from a first landmark to a second landmark based on the ordered sequence of images from each stream, wherein the clusters and directed edges are defined hierarchically, and wherein the directed edges are weighted based on a probability that connected clusters co-occur sequentially across one or more of the streams.

\* \* \* \* \*